(12) United States Patent
Kotake et al.

(10) Patent No.: US 9,592,556 B2
(45) Date of Patent: Mar. 14, 2017

(54) PROCESSING MACHINE

(71) Applicants: CITIZEN HOLDINGS CO., LTD., Tokyo (JP); CITIZEN MACHINERY MIYANO CO., LTD., Nagano (JP)

(72) Inventors: Kyota Kotake, Tokorozawa (JP); Noriyuki Asahara, Asaka (JP); Hiroshi Kasuya, Tokyo (JP)

(73) Assignees: Citizen Machinery Co., Ltd., Nagano (JP); Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 14/387,366

(22) PCT Filed: Mar. 27, 2013

(86) PCT No.: PCT/JP2013/059033
§ 371 (c)(1),
(2) Date: Sep. 23, 2014

(87) PCT Pub. No.: WO2013/146898
PCT Pub. Date: Oct. 3, 2013

(65) Prior Publication Data
US 2015/0090084 A1    Apr. 2, 2015

(30) Foreign Application Priority Data
Mar. 30, 2012 (JP) .................. 2012-079332

(51) Int. Cl.
*B23B 7/02* (2006.01)
*B23B 13/12* (2006.01)
(Continued)

(52) U.S. Cl.
CPC .............. *B23B 13/126* (2013.01); *B23B 7/06* (2013.01); *B23Q 1/763* (2013.01); *B23B 2260/126* (2013.01); *Y10T 82/2593* (2015.01)

(58) Field of Classification Search
CPC . B23B 13/126; B23B 2260/126; B23B 13/12; B23B 13/02; B23B 13/123; B23B 31/20; B23B 7/06; B23Q 1/763
(Continued)

(56) References Cited

U.S. PATENT DOCUMENTS 2,369,330 A * 2/1945 Wilson .................. B23B 13/126
                                                             279/51
4,068,545 A * 1/1978 Scheler .................. B23B 13/02
                                                             279/133
(Continued)

FOREIGN PATENT DOCUMENTS

| CN | 1886221 | 12/2006 | |
|----|---------|---------|---|
| DE | EP 1281473 A2 * | 2/2003 | ............... B23B 7/06 |

(Continued)

OTHER PUBLICATIONS

International Search Report (ISR) issued May 21, 2013 in International (PCT) Application No. PCT/JP2013/059033.
(Continued)

*Primary Examiner* — Sara Addisu
(74) *Attorney, Agent, or Firm* — Wenderoth, Lind & Ponack, L.L.P.

(57) ABSTRACT

A main spindle located in a region of a rotary guide bush device where the rotary guide bush device (has been attached to be disposed in a position of a front (F) along an axis (C) direction when the rotary guide bush device having a guide bush, which is supported in a removable manner by a guide bush-supporting base (supporting base) provided in the front (F) along the axis (C) direction of the main spindle, is removed. A seal member (fixed to the guide bush-supporting base has contact with an outer circumferential surface of a main spindle cover over an entire circumference, so that processing with or without the guide bush can be selected and a complicated process required for switching
(Continued)

the processing with or without the guide bush can be simplified.

4 Claims, 8 Drawing Sheets

(51) Int. Cl.
 *B23B 7/06* (2006.01)
 *B23Q 1/76* (2006.01)
(58) Field of Classification Search
 USPC .......... 82/123, 132, 137, 142, 149, 153, 155
 See application file for complete search history.

(56) References Cited

U.S. PATENT DOCUMENTS

| | | | | |
|---|---|---|---|---|
| 4,258,598 A * | 3/1981 | Hoffmann | ............ | B23B 13/126 82/124 |
| 4,376,398 A * | 3/1983 | Love | ............ | B23B 13/02 414/17 |
| 4,997,174 A * | 3/1991 | Nifong | ............ | B23Q 7/04 269/270 |
| 5,170,686 A * | 12/1992 | Schalles | ............ | B23B 13/123 29/37 A |
| 5,615,590 A * | 4/1997 | Speckhahn | ............ | B23B 13/126 279/143 |
| 2002/0005096 A1 * | 1/2002 | Miyano | ............ | B23B 13/02 82/127 |
| 2007/0227317 A1 | 10/2007 | Asahara et al. | | |
| 2008/0276772 A1 | 11/2008 | Ozawa | | |
| 2011/0179918 A1 | 7/2011 | Baumann | | |
| 2012/0067180 A1 * | 3/2012 | Lier | ............ | B23B 5/162 82/113 |
| 2015/0047480 A1 * | 2/2015 | Yanakawa | ............ | B23B 31/201 82/162 |

FOREIGN PATENT DOCUMENTS

| | | | |
|---|---|---|---|
| DE | 10 2008 051 611 | 4/2010 | |
| DE | WO 2010040680 A3 * | 10/2010 | ............ B23B 7/06 |
| EP | 1 698 416 | 9/2006 | |
| EP | 1 990 128 | 11/2008 | |
| JP | 62-106727 | 7/1987 | |
| JP | 5-131306 | 5/1993 | |
| JP | 9-225703 | 9/1997 | |
| JP | 2006-326732 | 12/2006 | |
| TW | 200911427 | 3/2009 | |
| WO | 2005/065869 | 7/2005 | |

OTHER PUBLICATIONS

Extended European Search Report issued Nov. 30, 2015 in corresponding European Patent Application No. 13769571.4.
Third Party Observations in EP Communication issued Jun. 22, 2016 in European Application No. 13769571.4.
Practical Automatic Lathe Handbook edited by Japanese Machine Tool Automatic Lathe Council, Sep. 30, 1968, pp. 49-50, with English translation.

* cited by examiner

PROCESSING MACHINE

TECHNICAL FIELD

The present invention relates to a processing machine, in particular, to an improvement in a processing machine including a guide bush.

BACKGROUND ART

In a conventional processing machine such as a lathe, a processing target (hereinafter, referred to as a workpiece) is fixed to a main spindle, and a part of the workpiece projecting from the leading end of the main spindle is processed by a tool while rotating the workpiece by rotating the main spindle about an axis. Some processing machines include a guide bush which supports a workpiece just proximal to a processing tool between a leading end of a main spindle and the processing tool. Such a guide bush is attached to a guide bush-supporting base fixed ahead of the leading end of the main spindle, and the workpiece is supported to be rotatable about an axis and movable in an axis direction.

It may be desired to perform processing without using a guide bush depending on a processing type and/or a condition of a workpiece even though the processing machine includes the guide bush.

A processing machine is therefore proposed in which a guide bush is removed from a guide bush-supporting base according to a condition to enable processing without using the guide bush (Patent Literature 1).

In this processing machine, a guide bush attachment hole for attaching a guide bush is formed in a guide bush-supporting base formed to be orthogonal to an axis direction of a main spindle, and the main spindle supporting the workpiece moves forward to the guide bush attachment hole to process the workpiece in a state in which the guide bush is removed from the guide bush-supporting base.

CITATION LIST

Patent Literature

Patent Literature 1: JP3359808B

In the processing machine described in Patent Literature 1, when the guide bush is removed, a cover member is attached to a region where the guide bush has been attached. The cover member is for filling a space between the guide bush attachment hole and an outer circumference of a main spindle moved therein. By filling the space, turnings, oil, or the like generated by processing with a processing tool can be prevented from entering in the back side of the main spindle.

However, unfortunately, such a processing machine requires a complicated process of attaching and removing the cover member in each case of attaching and removing the guide bush.

SUMMARY OF THE INVENTION

The present invention has been made in view of the above circumstances, and an object of the present invention is to provide a processing machine which enables selection of processing with or without a guide bush, and simplifies a complicated process required for switching the processing with or without the guide bush.

Solution to Problem

A processing machine according to the present invention includes a guide bush supported in a removable manner by a supporting base provided in a front along an axis direction of a main spindle. The main spindle is disposed in a position of a rear of the guide bush along the axis direction when the guide bush is attached to the supporting base, and the main spindle is moved to a region (position) of the guide bush where the guide bush has been attached to be disposed in a position of the front along the axis direction when the guide bush is removed from the supporting base. The supporting base is fixedly provided with a seal member which has contact with an outer circumferential surface on the main spindle side over an entire circumference when the main spindle is disposed in the position of the front.

In addition, the outer circumferential surface on the main spindle side represents the outer circumferential surface of the main spindle cover in a processing machine provided with the main spindle cover which covers an outer circumferential surface of a main spindle base by which the main spindle is supported and/or the outer circumferential surface of the main spindle from the outside, and also represents the outer circumferential surface of the main spindle in a processing machine in which the outer circumferential surface of the main spindle is exposed without having the main spindle cover.

ADVANTAGEOUS EFFECTS OF THE INVENTION

According to the processing machine of the present invention, processing with or without a guide bush can be selected, and a complicated process required for switching the processing with or without the guide bush can be simplified.

DESCRIPTION OF EMBODIMENT

Hereinafter, embodiments of a processing machine according to the present invention will be described with reference to the drawings.

(Embodiment 1)

Figure 1:
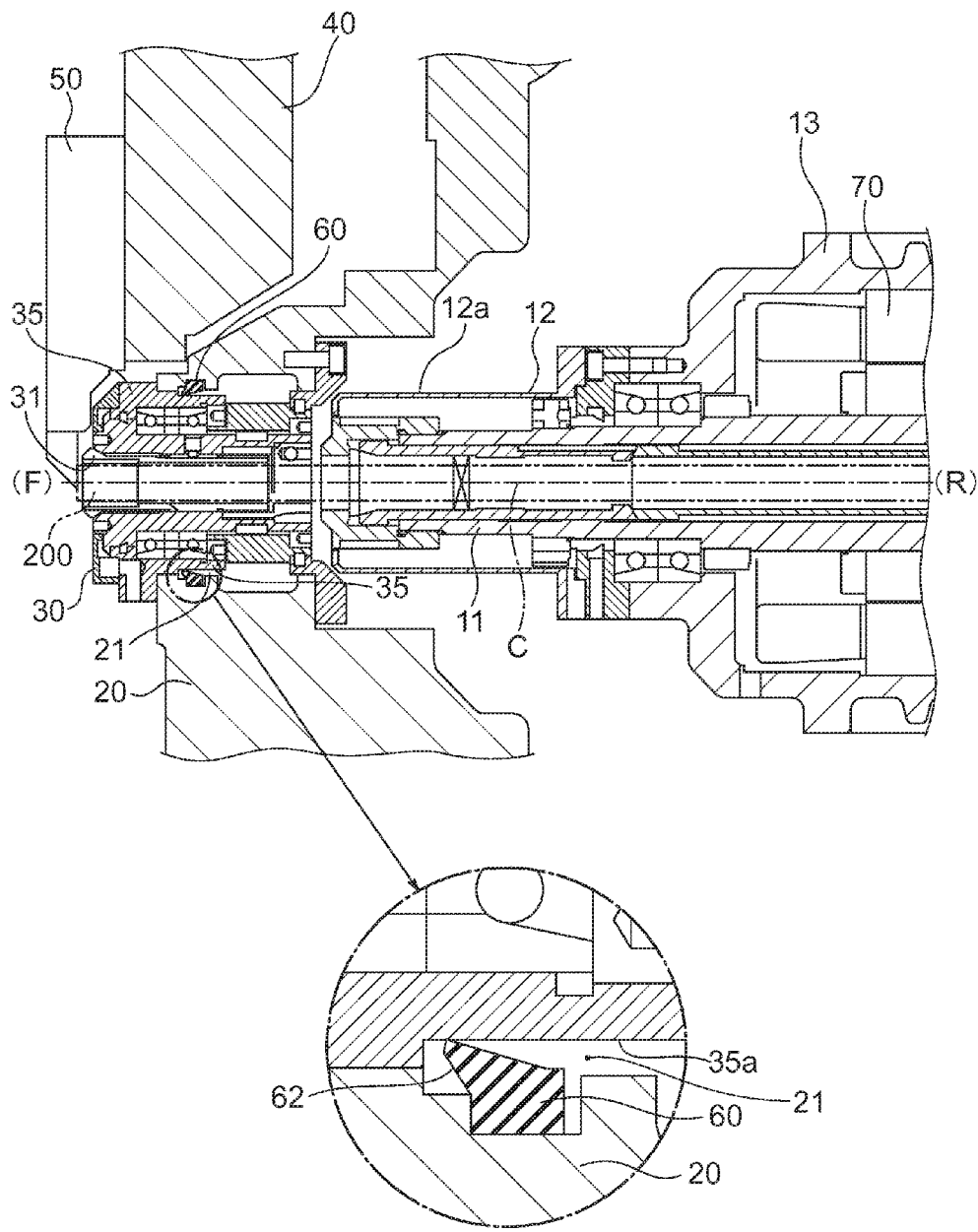
FIG. 1 is a sectional view illustrating a main portion of a processing machine according to Embodiment 1 of the present invention in a state in which a guide bush device is attached.

As illustrated in FIG. 1, the main portion of the processing machine of Embodiment 1 includes a main spindle 11 which maintains a workpiece 200, and rotates about an axis C and a rotary guide bush device 30 supported in a removable manner by a guide bush-supporting base 20 (supporting base) provided in a front F along an axis C direction of the main spindle 11. A tool 50 which processes the workpiece 200 is disposed in the front F just proximal to the rotary guide bush device 30.

As is known in the art, the tool 50 is fixed to a tool post 40 which is movable in one to three directions, and performs desired processing on a part of the workpiece 200 projecting to the front F from the rotary guide bush device 30 while moving in a movable direction. The main spindle 11 is supported by a main spindle base 13 to be drivable and rotatable about the axis C, an outer circumferential surface of the leading end portion of the main spindle 11 is covered from the outside by a main spindle cover 12 fixed to the main spindle base 13, and the main spindle 11 rotates and is driven by a built-in motor 70. The rotary guide bush device 30 is fixed to the guide bush-supporting base 20 through a guide bush holder 35, and the rotary guide bush device 30 can be removed from the guide bush-supporting base 20 together with the guide bush holder 35.

The rotary guide bush device 30 includes a bearing, a guide bush sleeve, a guide bush 31, and a draw bar connected to the guide bush 31 to change a diameter of the guide bush 31 by rotating about the axis C. An outside of the bearing is held in the guide bush holder 35, and the guide bush sleeve disposed inside the bearing, the guide bush 31, and the draw bar are rotatable about the axis C relative to the guide bush holder 35 in synchronization with the main spindle 11.

The workpiece 200 held in the rotary guide bush device 30 is rotatable about the axis C and movable along the axis C direction in the guide bush 31.

A sprocket is integrally attached to a guide bush sleeve, the guide bush 31 rotates about the axis C together with the guide bush sleeve by a belt wound around the sprocket, and this driving of the belt is synchronized with the rotation of the main spindle 11.

Figure 2:
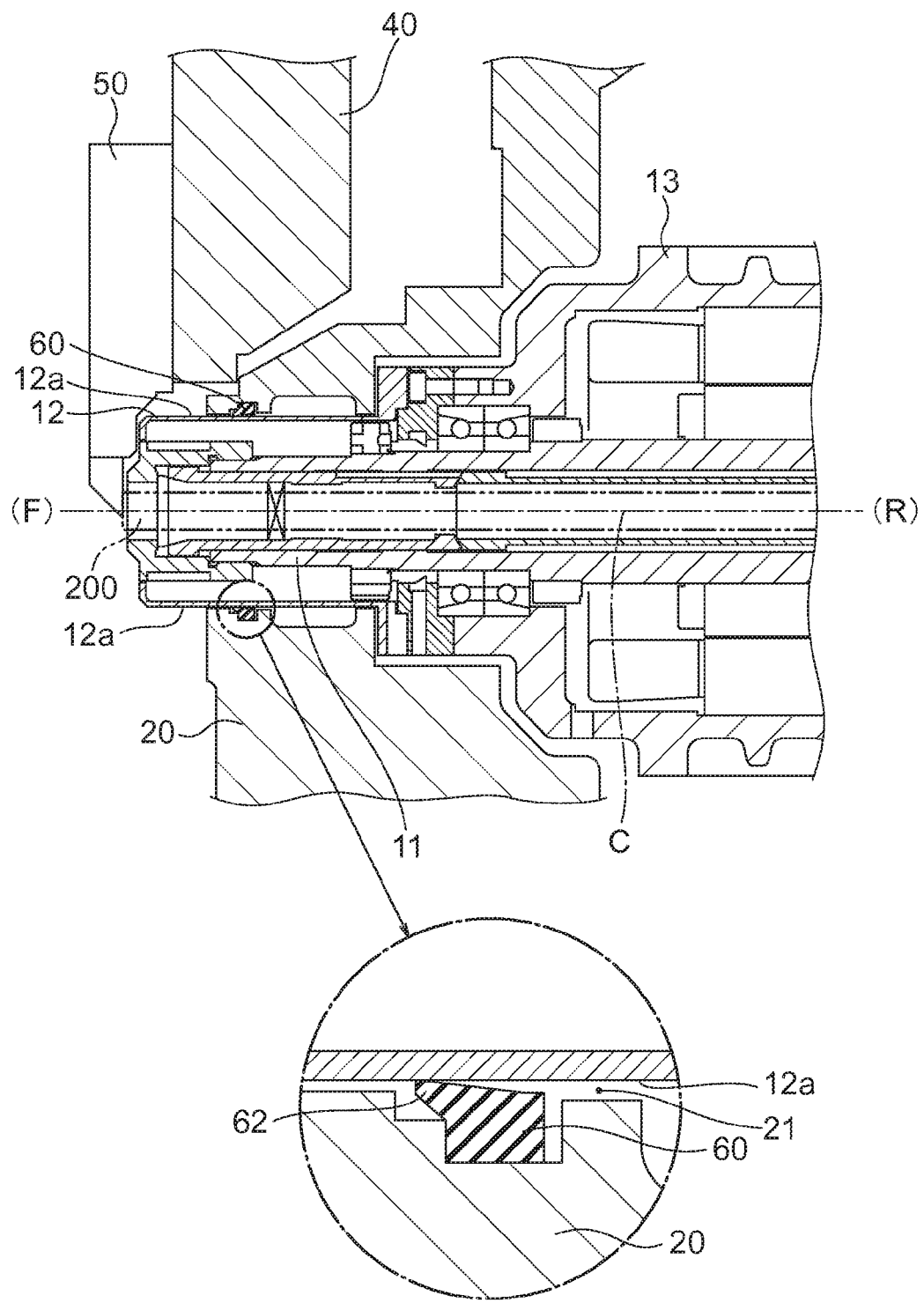
FIG. 2 is a sectional view illustrating the main portion of the processing machine illustrated in FIG. 1 in a state in which the guide bush device is removed.

The main spindle 11 is disposed in a position of a rear R of the rotary guide bush device 30 along the axis C direction when the rotary guide bush device 30 is attached to the guide bush-supporting base 20, as illustrated in FIG. 1. The main spindle 11 is moved to the region of the rotary guide bush device 30 where the rotary guide bush device 30 has been attached to be disposed in a position of the front F along the axis C direction when the rotary guide bush device 30 is removed from the guide bush-supporting base 20, as illustrated in FIG. 2.

The processing device can alternately select processing with the rotary guide bush device 30 and processing without the rotary guide bush device 30 according to a processing type or the like to be performed on the workpiece 200.

In this case, a through hole 21 of the guide bush-supporting base 20 in which the rotary guide bush device 30 is disposed is provided with a seal member 60 over the entire circumference of the through-hole 21. Namely, the seal member 60 is provided outside the guide bush holder 35 in the diameter direction in a region of a length from the rotary guide bush device 30 to the guide bush holder 35 in a state in which the rotary guide bush device 30 is attached to the guide bush-supporting base 20.

Figure 3:
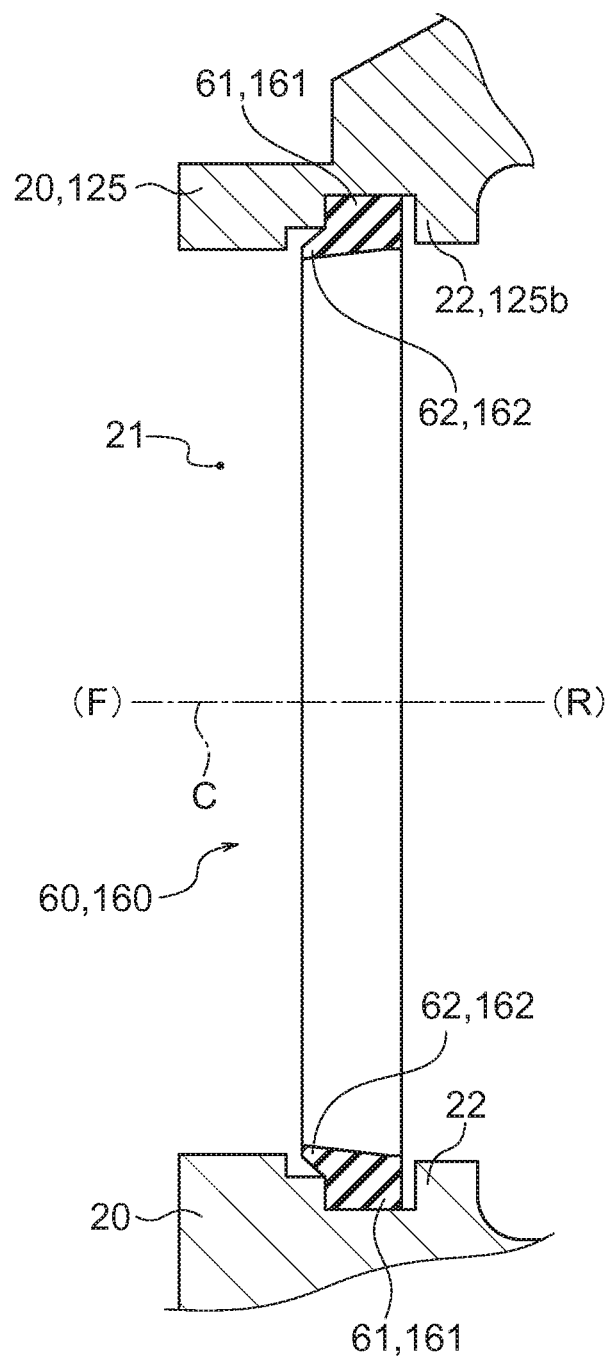
FIG. 3 is a sectional view illustrating details of a seal member.

The seal member 60 is formed into a circular shape. As illustrated in FIG. 3, an outer circumferential portion 61 of the seal member 60 is fixed to an opening edge portion 22 of the guide bush-supporting base 20 forming the through-hole 21. An inner circumferential portion 62 of the seal member 60 obliquely extends toward the front F and the axis C which is the center of the through-hole 21, and has a lip (hereinafter, referred to as a lip 62) whose thickness is reduced as it approaches closer to the leading end.

The inner diameter of the leading end of the lip 62 is set smaller than the outer diameter of an outer circumferential surface 12a of the main spindle cover 12 in a relaxed state prior to the seal member 60 being fixed to the guide bush-supporting base 20.

As illustrated in FIG. 1, when the rotary guide bush device 30 is attached to the guide bush-supporting base 20, and the main spindle 11 is located in a rear position R of the rotary guide bush device 30, the lip 62 of the seal member 60 does not have contact with the outer circumference surface 12a of the main spindle cover 12 in a position in a direction along the longitudinal axis C. On the other hand, when the rotary guide bush device 30 is removed from the guide bush-supporting base 20, and the main spindle 11 is disposed in a front position F, as illustrated in FIG. 2, the lip 62 of the seal member 60 has contact with the outer circumferential surface 12a of the main spindle cover 12 from the outside over the entire circumference.

With this configuration, even when turnings, cutting oil, or the like in the processing of the workpiece 200 with the tool 50 fly from the front F to the rear R along the axis C direction of the main spindle 11, these are blocked by the seal member 60 which seals the space between the guide bush-supporting base 20 and the main spindle cover 12. Thus, the turnings, cutting oil, or the like are prevented from entering in the rear R of the portion with which the seal member 60 has contact.

Moreover, the lip 62 extends toward the front F, so that the turnings, cutting oil, or the like adhered to a part of the outer circumferential surface 12a of the main spindle cover 12 in the front F of the lip 62 are removed by the leading end of the lip 62 when the main spindle 11 returns to the position of the rear R. Thus, the outer circumferential surface 12a of the main spindle cover 12 returned to the position of the rear R is prevented from being adhered by the turnings, cutting oil, or the like.

The main spindle cover 12 when the rotary guide bush device 30 is attached to the guide bush-supporting base 20 may differ from the main spindle cover 12 when the rotary guide bush device 30 is removed from the guide bush-supporting base 20. The main spindle cover 12 in which the outer circumferential surface 12a has contact with the lip 62 of the seal member 60 from the outside when the rotary guide bush device 30 is removed from the guide bush-supporting base 20 may be used.

On the other hand, when the rotary guide bush device 30 is attached to the guide bush-supporting base 20 by the guide bush holder 35, there is a no space between the guide bush holder 35 and the guide bush-supporting base 20. The turnings, cutting oil, or the like therefore do not enter in the rear R of the rotary guide bush device 30.

Namely, it is not necessary to seal between the guide bush holder 35 and the guide bush-supporting base 20 because the lip 62 of the seal member 60 has contact with the outer circumferential surface 35a of the guide bush holder 35.

Figure 4:
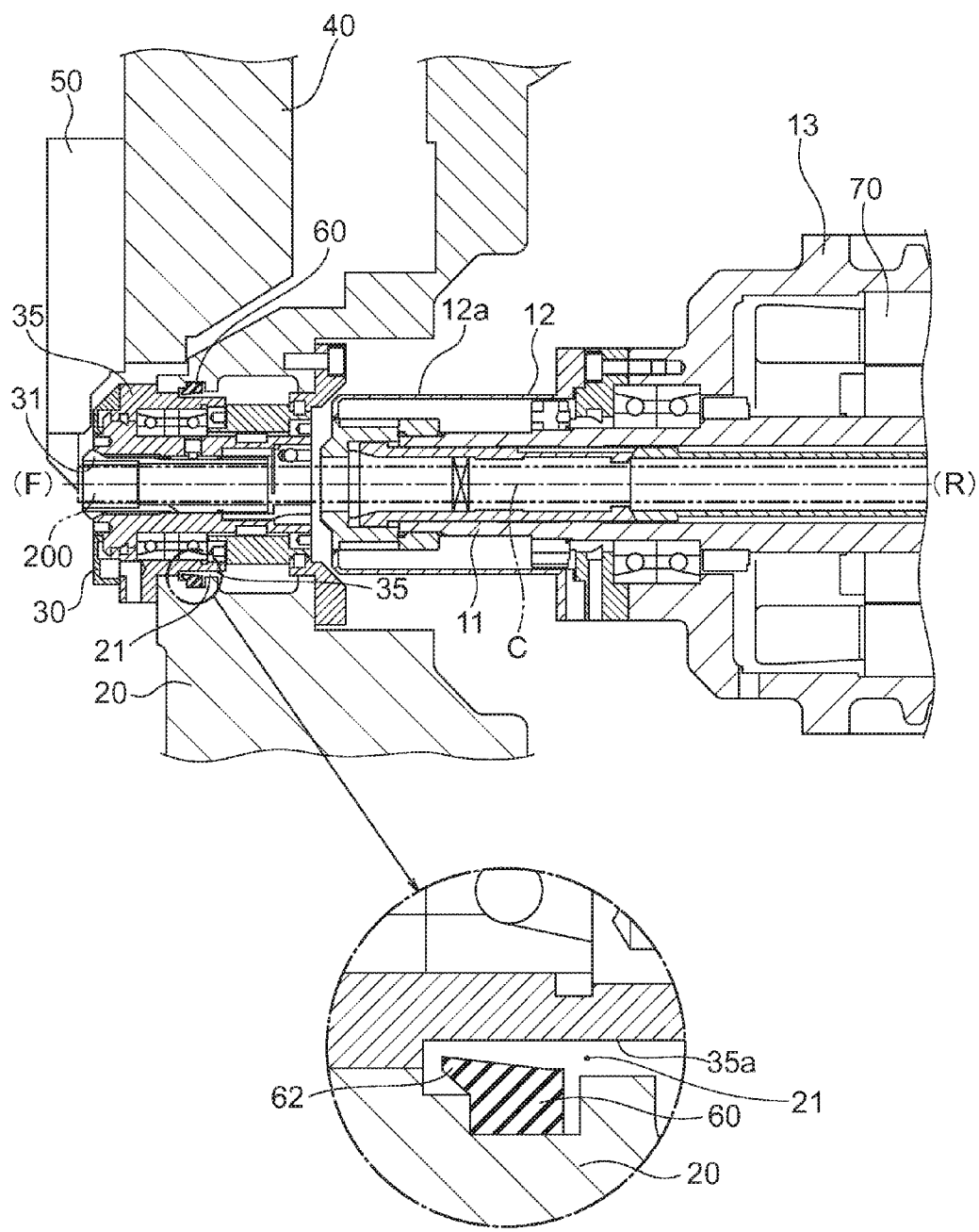
FIG. 4 is a sectional view illustrating a main portion according to a modified example of Embodiment 1.

Referring to FIG. 1, in a state in which the guide bush device 30 is attached to the guide bush-supporting base 20, the lip 62 of the seal member 60 has contact with the outer circumferential surface 35a of the guide bush holder 35. However, the inner diameter of the lip 62 is set larger than the outer diameter of the outer circumferential surface 35a of the guide bush holder 35, such that the lip 62 of the seal member 60 does not have contact with the outer circumferential surface 35a of the guide bush holder 35, as illustrated in FIG. 4 when the main spindle 11 is located in the position of the rear R of the rotary guide bush device 30.

In this case, the lip 62 of the seal member 60 does not contact the outer circumferential surface 35a of the guide bush holder 35, so that the acceleration of the wear of the seal member 60 is prevented. Moreover, the main spindle cover 12 can be removed in this case.

In addition, the processing machine of the present embodiment is a machine in which the guide bush 31 of the rotary guide bush device 30 is applied as a guide bush. However, the processing machine according to the present invention is not limited to the processing machine using the guide bush of the rotary guide bush device, and may be a machine using a guide bush of a fixed guide bush device.

(Embodiment 2)

As illustrated in FIGS. 5, 6, 7, 8, the main portion of the processing machine of Embodiment 2 includes a main spindle 111 which holds the workpiece 200, and rotates about an axis C, and a fixed guide bush device 130 (refer to FIG. 5) or a rotary guide bush device 230 (refer to FIG. 6) supported in a removable manner by a guide bush-supporting base 120 (supporting base) provided in the front F along the axis C direction of the main spindle 111. A tool 150 which processes the workpiece 200 is disposed in the front F just proximal to the fixed guide bush device 130 or the rotary guide bush device 230.

As is known in the art, the tool 150 is fixed to a not-shown tool post which is movable in one to three directions, and performs desired processing on a part of the workpiece 200 projecting to the front F from the fixed guide bush device 130 or the rotary guide bush device 230 while moving in a movable direction.

The main spindle 111 is supported by a main spindle base 113 to be drivable and rotatable about the axis C, the outer circumferential surface of the leading end portion of the main spindle 111 is covered from the outside by main spindle covers 114, 115, 116 fixed to the main spindle base 113, and the main spindle 111 rotates and is driven by a built-in motor 170.

In this case, the main spindle covers 114, 115, 116 are formed such that the outer diameter of the main spindle cover 116 corresponding to the rear side portion is thicker than the outer diameters of the main spindle covers 114, 115 corresponding to the front side portion along the axis C direction.

The fixed guide bush device 130 and the rotary guide bush device 230 are fixed to the guide bush-supporting base 120 through guide bush holders 135, 235, respectively, and can be removed from the guide bush-supporting base 120 together with the guide bush holders 135, 235.

The rotary guide bush device 230 includes a bearing, a guide bush sleeve, a guide bush 231, and a draw bar connected to the guide bush 231 to change a diameter of the guide bush 231 by rotating about the axis C. The outside of the bearing is held in the guide bush holder 235, and the guide bush sleeve disposed inside the bearing, the guide bush 231, and the draw bar are rotatable about the axis C relative to the guide bush holder 235 in synchronization with the main spindle 111. The workpiece 200 held in the rotary guide bush 230 is rotatable about the axis C and movable along the axis C direction in the guide bush 231. A sprocket is integrally attached to the guide bush sleeve, and the guide bush 231 rotates about the axis C together with the guide bush sleeve by a belt wound around the sprocket. The driving of the belt is synchronized with the rotation of the main spindle 111.

On the other hand, the fixed guide bush device 130 includes a guide bush 131 and a draw bar connected to the guide bush 131 to change the diameter of the guide bush 131 by rotating about the axis C. The outside of the guide bush 131 is held in the guide bush holder 135. The workpiece 200 held in the fixed guide bush device 130 is rotatable about the axis C and movable along the axis C direction in the guide bush 131.

Figure 5:
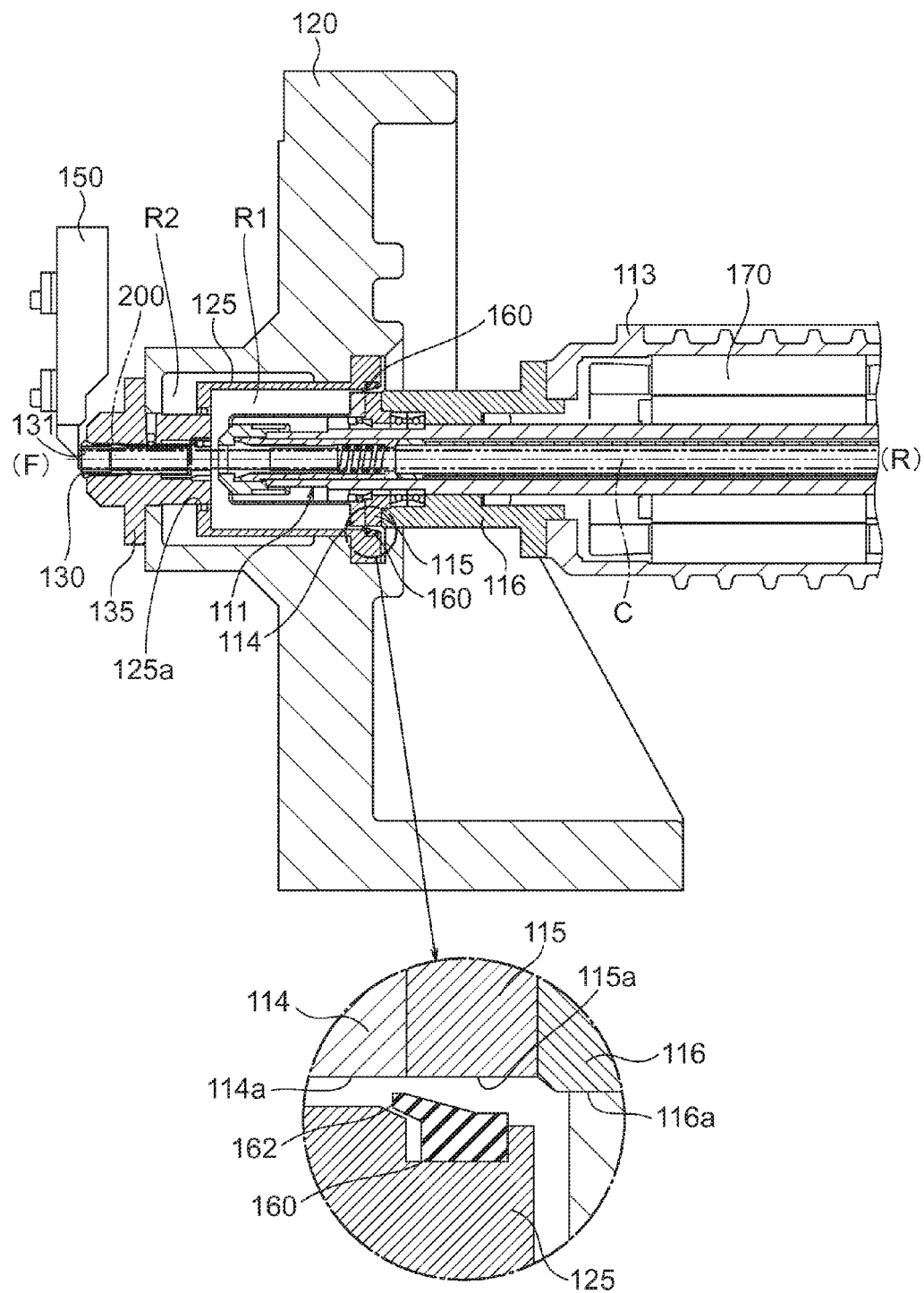
FIG. 5 is a sectional view illustrating a main portion of a processing machine according to Embodiment 2 of the present invention in a state in which a fixed guide bush device is attached.
Figure 6:
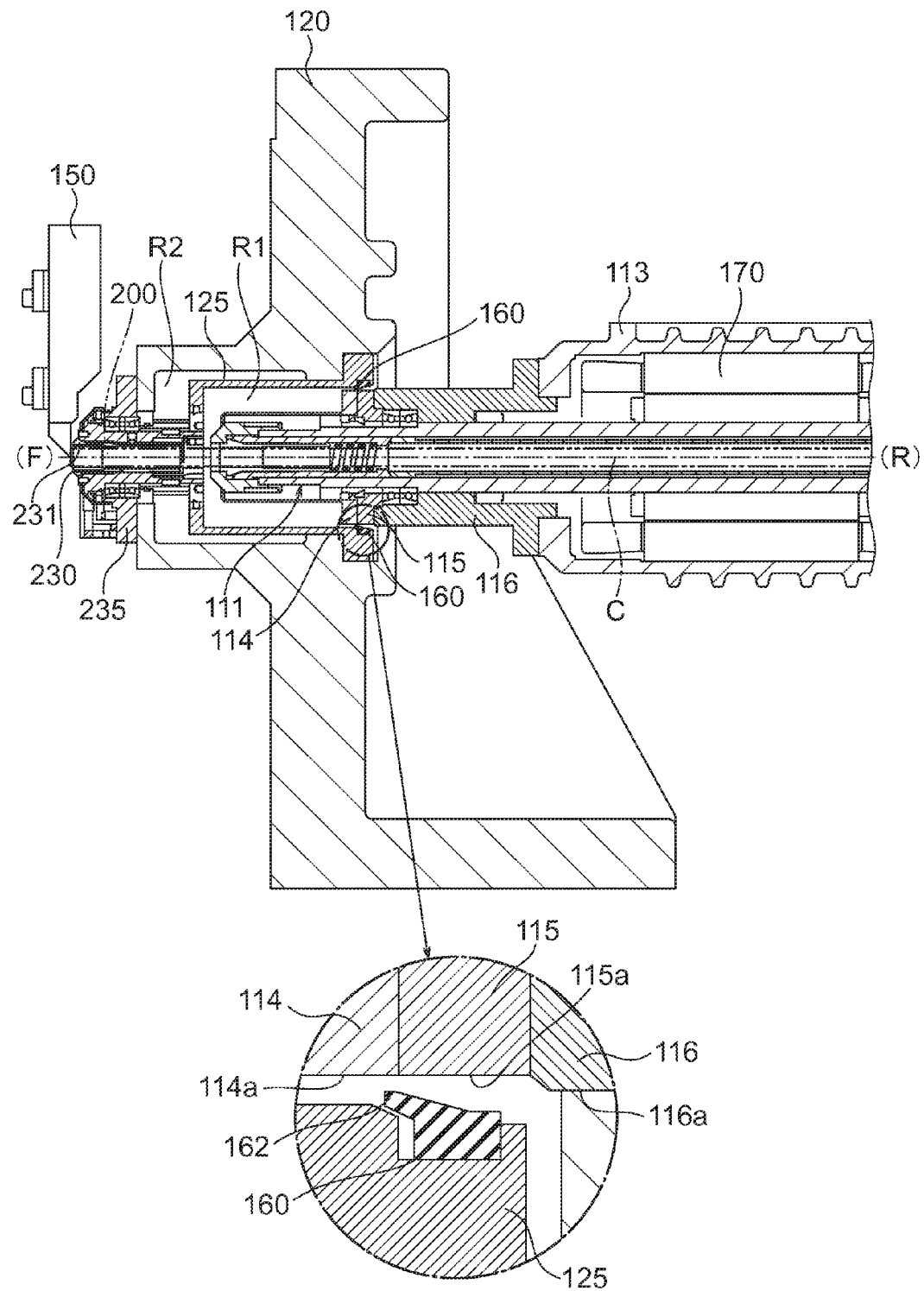
FIG. 6 is a sectional view illustrating the main portion of the processing machine illustrated in FIG. 5 in a state in which a rotary guide bush device is attached instead of the fixed guide bush device.
Figure 7:
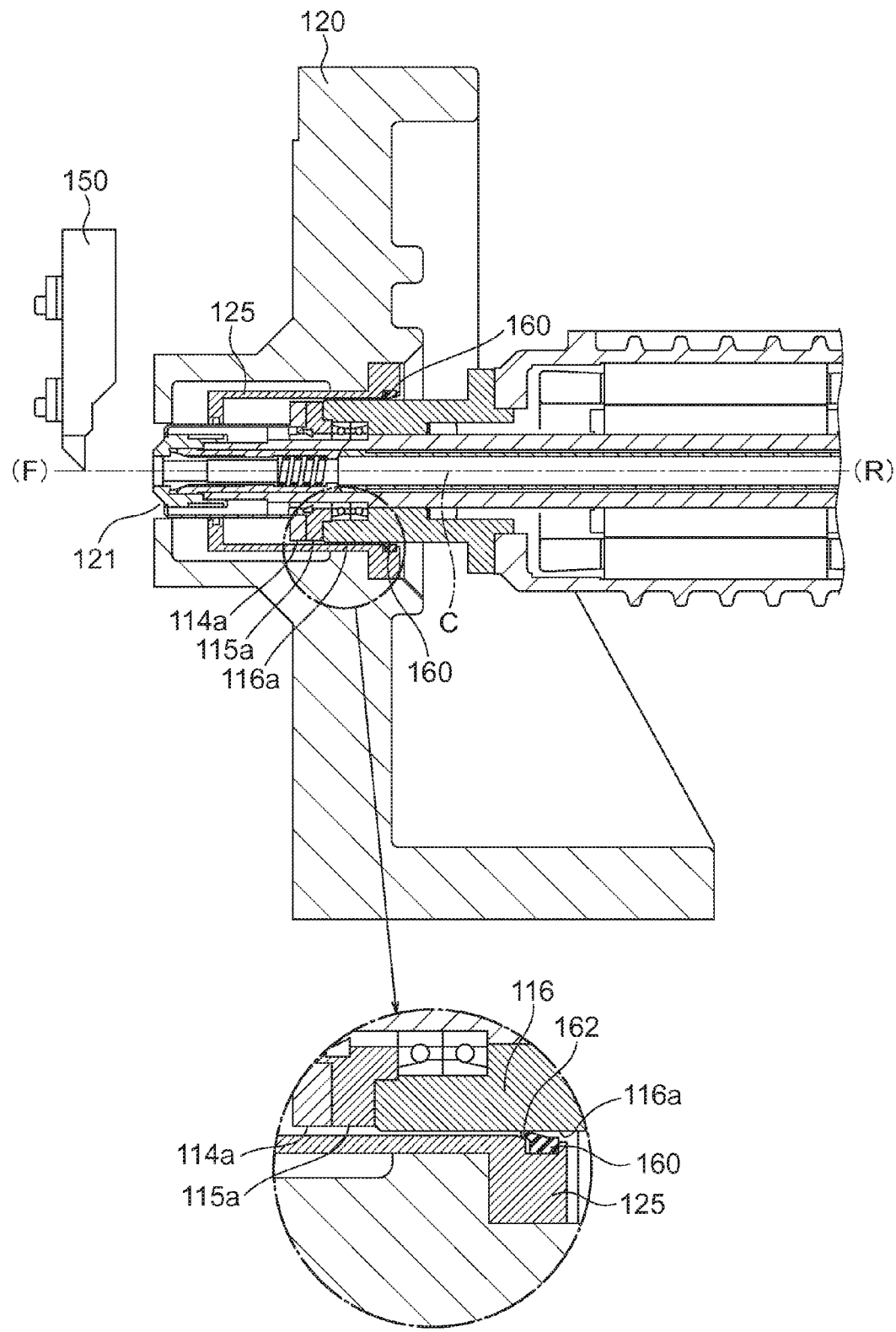
FIG. 7 is a sectional view illustrating the main portion of the processing machine illustrated in FIGS. 5, 6 in a state in which the guide bush device is removed (main spindle is located in the last end).
Figure 8:
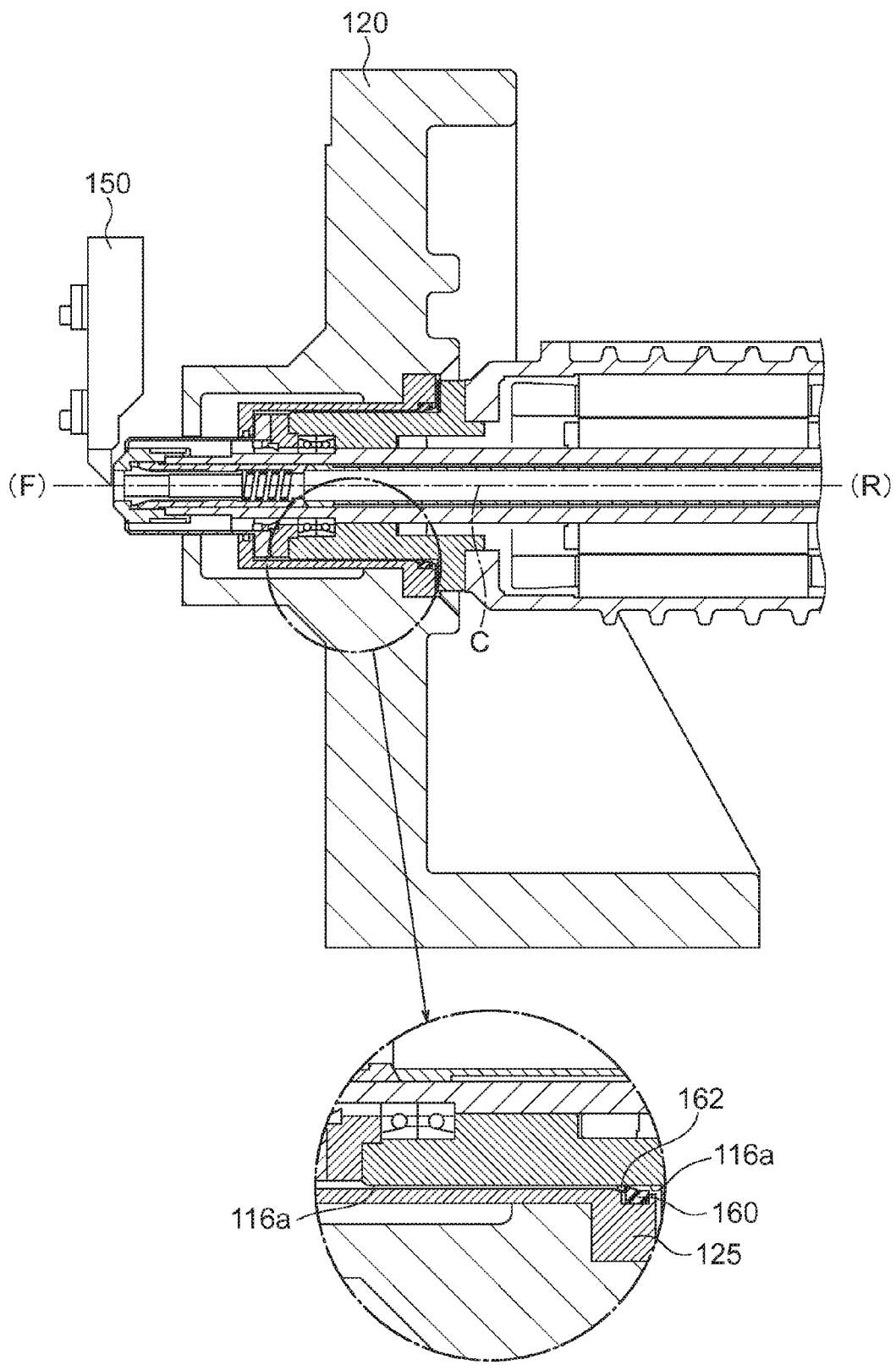
FIG. 8 is a sectional view illustrating the main portion of the processing machine illustrated in FIGS. 5, 6 in a state in which the guide bush device is removed (main spindle is located in the front end).

The main spindle 111 is disposed in the position of the rear R of the fixed guide bush device 130 or the rotary guide bush device 230 along the axis C direction when the fixed guide bush device 130 or the rotary guide bush device 230 is attached to the guide bush-supporting base 120, as illustrated in FIGS. 5, 6. The main spindle 111 is moved to the region of the fixed guide bush device 130 or the rotary guide bush device 230 where the fixed guide bush device 130 or the rotary guide bush device 230 has been attached to be disposed in the position of the front F along the axis C direction when the fixed guide bush device 130 and the rotary guide bush device 230 are removed from the guide bush-supporting base 120, as illustrated in FIGS. 7, 8.

The processing machine can alternately select processing with the fixed guide bush device 130, processing with the rotary guide bush device 230, and processing without the fixed guide bush device 130 and the rotary guide bush device 230 according to a processing type or the like to be performed on the workpiece 200.

In this case, a tubular attachment member 125 is provided in a part of the guide bush-supporting base 120 opposite to a part of the front F of the main spindle 111. An end portion 125a of the attachment member 125 in the front F is located adjacent to or has contact with the guide bush holder 135, 235 attached to the guide bush-supporting base 120, and seals an inside space R1 and an outside space R2 divided by the attachment member 125. The inside space R1 is a space in which the main spindle 111 is disposed.

A part of the attachment member 125 in the rear R along the axis C direction is provided with the seal member 160 over the entire circumference of the inner circumference surface of the attachment member 125.

The main spindle covers 114, 115, which are front thin diameter portions along the axis C direction, and the main spindle cover 116, which is a rear thick diameter portion having an external diameter thicker than the thin diameter potions, are formed.

The seal member 160 is disposed outside the thin diameter portion of the main spindle covers 114, 115, 116 when the fixed guide bush device 130 or the rotary guide bush device 230 is attached to the guide bush-supporting base 120, and is disposed outside the thick diameter portion when the fixed guide bush device 130 and the rotary guide bush device 230 are removed from the guide bush-supporting base 120.

As illustrated in FIG. 3, the seal member 160 is formed in a circular shape similar to the seal member 60 in Embodiment 1. An outer circumferential portion 161 of the seal member 160 is fixed to an inner circumferential surface 125b of the attachment member 125, and an inner circumferential portion 162 of the seal member 160 obliquely extends toward the front F and the axis C which is the center of the main spindle 111, and has a lip whose thickness is reduced as it approaches closer to the leading end (hereinafter, referred to as a lip 162).

In a state in which the seal member 160 is fixed to the attachment member 125, the inner diameter of the leading end of the lip 162 is smaller than the outer diameter of the outer circumferential surface 116a of the main spindle cover 116, which is a thick diameter (second portion) portion, and is larger than the outer diameter of the outer circumferential surfaces 114a, 115a of the main spindle covers 114, 115, which are thin diameter (first) portions.

The outer circumferential surfaces 114a, 115a of the main spindle covers 114, 115 are set such that the leading end of the lip 162 is located in the stroke range of the main spindle 111 when the workpiece 200 is processed by using the fixed guide bush device 130 or the rotary guide bush device 230, namely, the stroke range of the main spindle covers 114, 115 corresponding to the range between the front end position and the last end position of the main spindle 111 in processing.

As illustrated in FIGS. 5, 6, when the fixed guide bush device 130 or the rotary guide bush device 230 is attached to the guide bush-supporting base 120, and the main spindle 111 is located in the position of the rear R, the lip 162 of the seal member 160 does not have contact with the outer circumference surfaces 114a, 115a of the main spindle covers 114, 115 from the outside, so that the processing can be performed without the contact between the seal member 160 (lip 162) and the outer circumference surfaces 114a, 115a of the main spindle covers 114, 115.

On the other hand, when the fixed guide bush device 130 and the rotary guide bush device 230 are removed from the guide bush-supporting base 120, and the main spindle 111 is disposed in the position of the front F, as illustrated in FIG. 7, the lip 162 of the seal member 160 has contact with the outer circumference surface 116a of the main spindle cover 116 from the outside over the entire circumference.

With this configuration, even when turnings, cutting oil, or the like in the processing of the workpiece 200 with the tool 150 fly from the front F to the rear R along the axis C direction of the main spindle 111, these are blocked by the seal member 160 sealing the space between the attachment member 125 of the guide bush-supporting base 120 and the main spindle cover 116. Thus, the turning, cutting oil, or the like are prevented from entering in the rear R of the portion with which the seal member 160 has contact.

Moreover, since the lip 162 extends toward the front F, the turnings, cutting oil, or the like adhered to a part of the outer circumferential surface 116a of the main spindle cover 116 in the front F of the lip 162 are removed by the leading end of the lip 162 when the main spindle 111 returns to the position of the rear R. Therefore, the turnings, cutting oil, or the like are prevented from being adhered to the outer circumferential surface 116a of the main spindle cover 116 returned to the position of the rear R.

In addition, FIG. 7 illustrates a state in which the main spindle 111 is disposed in the last end position of the movable range of the main spindle 111 when the workpiece 200 is processed without using the fixed guide bush device 130 or the rotary guide bush device 230. On the other hand, FIG. 8 illustrates a state in which the main spindle 111 is disposed in the front end position of the movable range of the main spindle 111.

The lip 162 of the seal member 160 is maintained in a state which has contact with the outer circumferential surface 116a of the main spindle cover 116 from the outside over the entire region of the movable range of the main spindle 111, and the processing can be performed in a state in which the seal member 160 (lip 162) has contact with the outer circumferential surface 116a of the main spindle cover 116.

On the other hand, when the fixed guide bush device 130 or the rotary guide bush device 230 is attached to the guide bush-supporting base 120, there is no space between the guide bush holder 135, 235 and the guide bush-supporting base 120. Thus, the turnings, cutting oil, or the like do not enter into the rear R of the fixed guide bush device 130 and the rotary guide bush device 230.

More specifically, it is not necessary for the lip 162 of the seal member 160 to seal between the guide bush holder 135, 235 and the guide bush-supporting base 120 by the contact with any of the members. The acceleration of the wear of the seal member 160 can be thus prevented.

However, in any of the above-described cases, a tiny amount of oil or the like may enter into the inside space R1 divided by the attachment member 125 from the inner diameter side of the guide bush. This amount of oil entering is not a problem for the leakage to the rear R of the main spindle 11, 111. However, if the oil or the like enters into the outside space R2 divided by the attachment member 125, it becomes a problem for the driving side of the rotary guide bush device 230 when the rotary guide bush device 230 is attached. On the other hand, by forming a sealing structure between the end portion 125a of the attachment member 125 in the front F and the rotary guide bush device 230, the oil or the like entering in the inside space R1 is prevented from entering into the outside space R2. The oil or the like can be therefore prevented from being adhered to a sprocket or a belt which is disposed in the outside space R2 to rotate the rotary guide bush 230 about the axis C.

In the present embodiment, a labyrinth seal (FIG. 6) is provided between the end portion 125a of the attachment member 125 in the front F the rotary guide bush device 230. In addition, another type of a seal member may be provided between the end portion 125a and the rotary guide bush device 230.

In the processing machine according to Embodiment 2, the portion in which the thickness of the outer circumference surfaces 114a, 115a of the main spindle covers 114, 115 and the thickness of the outer circumference surface 116a of the main spindle cover 116 are changed is formed by a step whose thickness is sharply changed, but such a thickness-changing portion may be formed by a taper whose thickness is gradually changed.

In each of the above-described Embodiments 1, 2 and the modified example, in the machines using the rotary guide bush devices 30, 230, the turnings, cutting oil, or the like can be prevented from entering in the rear R of the main spindle 11, 111 by the seal member 60, 160 in a state in which the rotary guide bush device 30, 230 is removed from the guide bush-supporting base 20, 120. However, the turnings, cutting oil, or the like may blow in a part of the main spindle 11, 111 in the front F of the seal member 60, 160.

In this case, when a driving side pulley and belt driving the rotary guide bush device 30, 230 are disposed in a portion in the front F of the seal member 60, 160, the oil or the like may blow in the pulley and belt.

In the above-described configuration, it is preferable for the portion where the pulley and the belt are disposed to be covered by a cover for shielding from the turnings, cutting oil, or the like.

In addition, the above-described Embodiments 1, 2 illustrate the processing device provided with the main spindle covers 12, 114, 115, 116 which cover the main spindle 11, 111 from the outside of the outer circumference surface of the main spindle 11, 111. Therefore, in the processing without using the guide bush device 30, 130, 230, the seal member 60, 160 has contact with the outer circumference surface 12a, 116a of the main spindle cover 12, 116 for sealing. However, different from such a processing machine, in a processing machine in which an outer circumference surface of a main spindle is exposed without providing the main spindle cover, a seal member has contact with the outer circumference surface of the main spindle for sealing in processing without using the guide bush device 30, 130, 230. In such a processing machine, a seal member which seals the outer circumference surface of the main spindle can be a seal member which seals the outer circumference surface of the main spindle cover. Such a configuration belongs to the technical scope of the processing machine according to the present invention.

The processing machine according to the above-described embodiments includes the main spindle covers 12, 114, 115, 116 which cover the outer circumference surface of the main spindle 11, 111 from the outside. The outer circumference surface of the main spindle cover 12, 114, 115, 116 corresponds to the outer circumference surface on the main spindle side in the processing machine according to the present invention. In the processing machine without the main spindle covers 12, 114, 115, 116, the outer circumference surface of the main spindle 11, 111 corresponds to the outer circumference surface on the main spindle side in the processing machine according to the present invention.

In the processing machine according to the above-described embodiments, the seal member 60, 160 has contact with the outer circumference surface 12a, 116a of the main spindle cover 12, 116 over the entire circumference. However, as long as the sealing is performed between the seal member 60, 160 and the outer circumference surface 12a, 116a of the main spindle cover 12, 116, it is substantially equal to the contact between the seal member 60, 160 and outer circumference surface 12a, 116a of the main spindle cover 12, 116 even when a small space is formed between the seal member 60, 160 and the outer circumference surface 12a, 116a of the main spindle cover 12, 116. In this case, it is considered that the seal member 60, 160 has contact with the outer circumference surface 12a, 116a of the main spindle cover 12, 116 over the entire circumference.

CROSS-REFERENCE TO RELATED APPLICATION

The present application is based on and claims priority from Japanese Patent Application No. 2012-079332, filed on Mar. 30, 2012, the disclosure of which is hereby incorporated by reference in its entirety.

DESCRIPTION OF REFERENCE NUMERALS 11, 111 main spindle
12, 114, 115, 116 main spindle cover
12a, 114a, 115a, 116a outer circumference surface
13, 113 main spindle base
20, 120 guide bush-supporting base
21 through-hole
22 opening edge portion
30, 230 rotary guide bush device
31, 131, 231 guide bush
35, 135, 235 guide bush holder
35a outer circumference surface
40 tool post
50, 150 tool
60, 160 seal member
61, 161 outer circumference portion
62, 162 inner circumference portion, lip
70, 170 built-in motor
130 fixed guide bush device
200 workpiece (processing target)
C axis
F front
R rear

The invention claimed is:

1. A processing machine comprising:
a main spindle;
a guide bush; and
a supporting base at a front section of said processing machine with respect to an axial direction of said main spindle, said supporting base supporting said guide bush in a removable manner;
wherein said main spindle is located in a rear position of said guide bush with respect to the axial direction when said guide bush is attached to said supporting base, and said main spindle is located in a position of said guide bush whereat said guide bush had been located in a front position with respect to the axial direction when said guide bush is removed from said supporting base;
wherein said supporting base has a fixed seal member contacting an outer circumferential surface of one of said main spindle or a main spindle cover over an entire circumference of said one of said main spindle, said main spindle cover, or said main spindle base when said main spindle is disposed in the front position;
wherein said seal member is located outside of an outer circumferential surface of said guide bush when said guide bush is attached to said supporting base; and
wherein an inner diameter of said seal member in a relaxed state is smaller than an outer diameter of said one of said main spindle, said main spindle cover, or said main spindle base.

2. The processing machine according to claim 1, further comprising a guide bush holder holding said guide bush, said inner diameter of said seal member being larger than an outer diameter of said guide bush holder.

3. A processing machine comprising:
a main spindle;
a guide bush; and
a supporting base at a front section of said processing machine with respect to an axial direction of said main spindle, said supporting base supporting said guide bush in a removable manner;
wherein said main spindle is located in a rear position of said guide bush with respect to the axial direction when said guide bush is attached to said supporting base, and said main spindle is located in a position of said guide bush whereat said guide bush had been located in a front position with respect to the axial direction when said guide bush is removed from said supporting base;
wherein said supporting base has a fixed seal member contacting an outer circumferential surface of one of said main spindle or a main spindle cover over an entire circumference of said one of said main spindle, said main spindle cover, or said main spindle base when said main spindle is disposed in the front position;
wherein said one of said main spindle, said main spindle cover, or said main spindle base includes a first portion located along the axial direction and a second portion located rearward of said first portion along the axial direction, said second portion having an outer diameter larger than an outer diameter of said first portion; and wherein said seal member is located outside of said first portion in a radial direction when said guide bush is attached to said supporting base, said seal member is located outside said second portion in the radial direction when said guide bush is removed from said supporting base, and an inner diameter of said seal member in a relaxed state is smaller than an outer diameter of said second portion.

4. The processing machine according to claim 3, wherein said inner diameter of said seal member is larger than an outer diameter of said first portion.

\* \* \* \* \*